Aug. 22, 1933.   J. A. WHITE ET AL   1,923,404
AIRPLANE RADIATOR
Filed April 15, 1931   2 Sheets-Sheet 2
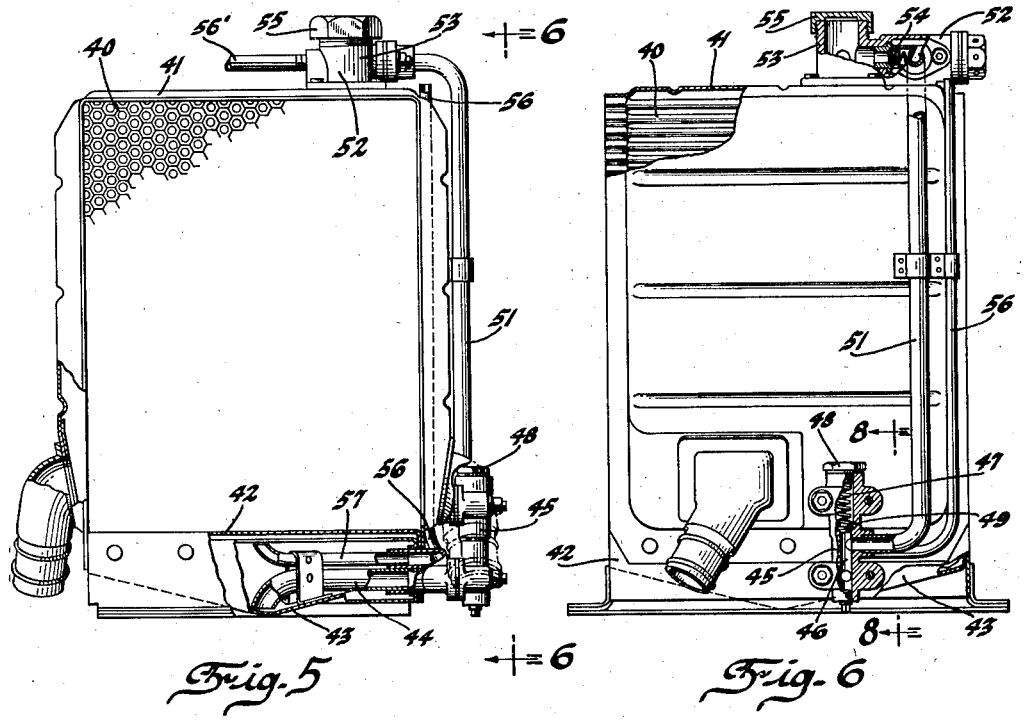
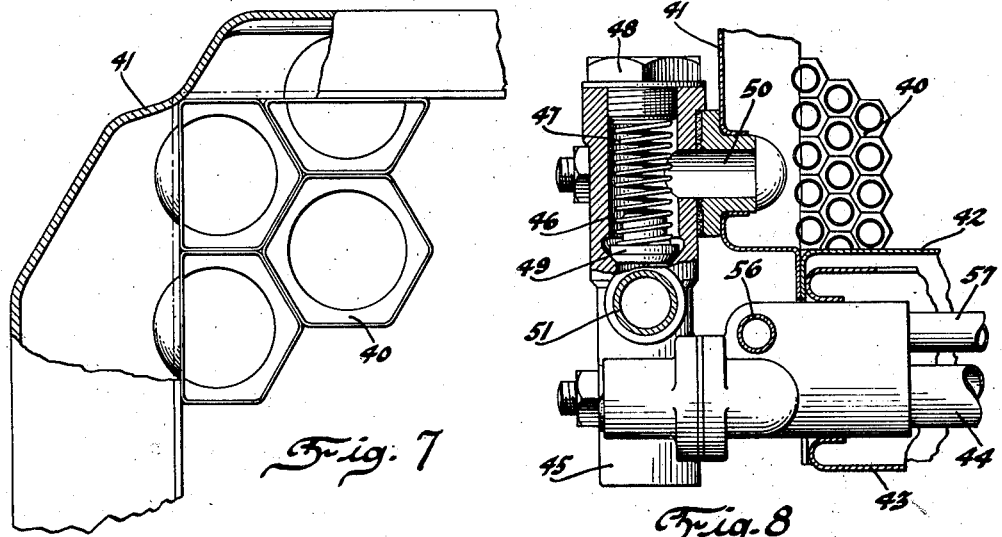
Inventor
James A. White
Harold Caminez Patented Aug. 22, 1933

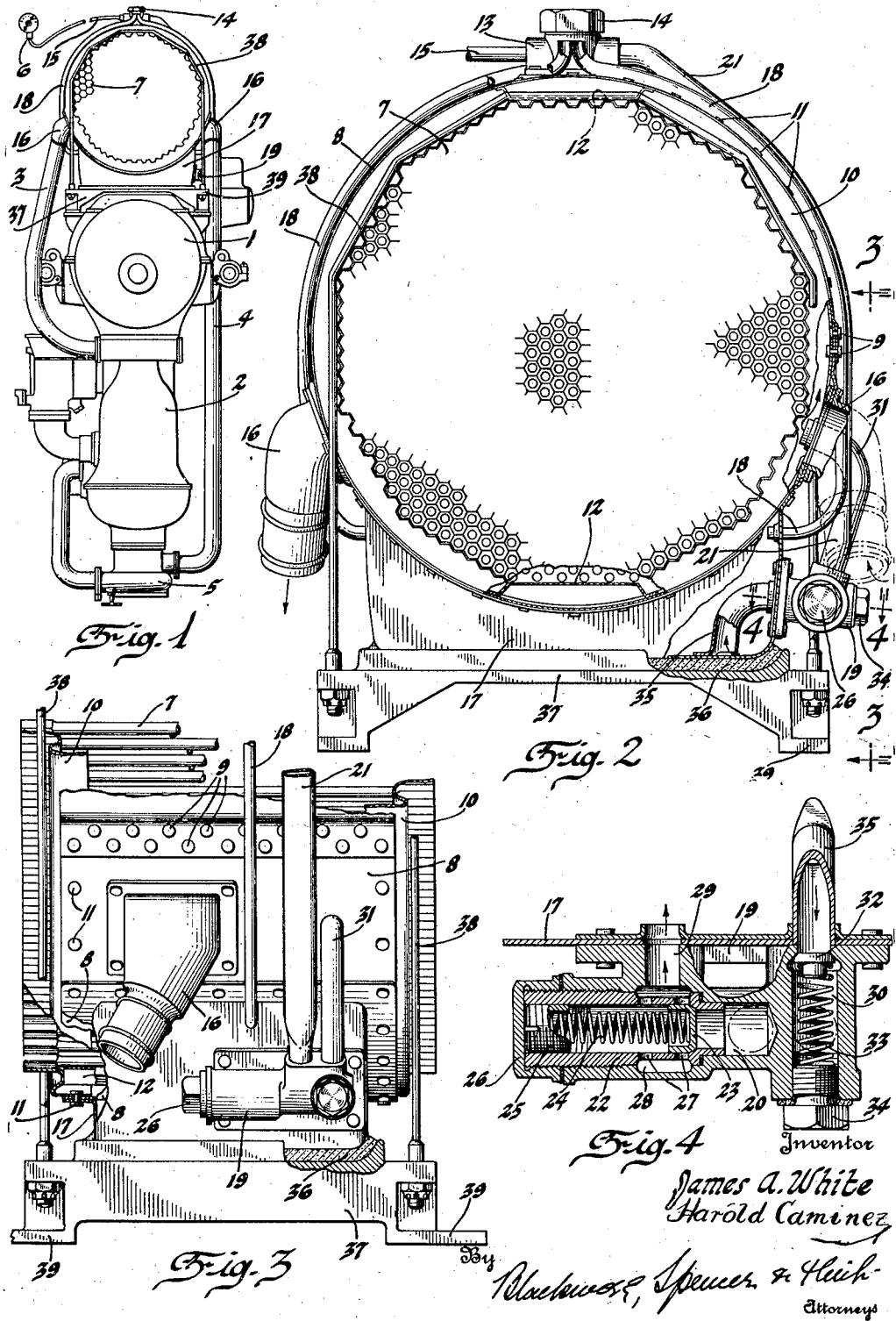

1,923,404

UNITED STATES PATENT OFFICE 1,923,404

AIRPLANE RADIATOR

James A. White, Lockport, N. Y., and Harold Caminez, Indianapolis, Ind., assignors to Harrison Radiator Corporation, Lockport, N. Y., a Corporation of New York Application April 15, 1931. Serial No. 530,420

13 Claims. (Cl. 257—125)

This invention relates to heat transfer systems and particularly to a circulatory liquid cooling system for internal combustion engines or the like.

It has been found that more heat can be dissipated per unit of radiating area if the circulating system is closed to atmosphere and completely filled with a coolant under pressure, and further, that the rate of cooling in such closed pressure system can be appreciably increased by the use of a coolant having a relatively high boiling point. From these observations it follows that the size of the radiating unit for a given engine and the amount of coolant necessary can be materially reduced as compared with conventional vented cooling system requirements. A reduction in size and in weight both of the system and of the liquid or heat carrying agent has obvious advantages, particularly in connection with aircraft design.

It may be mentioned that in the conventional open system water is the agent generally used for carrying excess heat from the engine to the radiating unit. For aircraft work where weight and wind resistance are important items some attempts have been made heretofore to cut down the weight of the liquid cooled engine and the size of the radiator by substituting for water in an open system a lesser amount of a commercial high boiling point coolant. Wholly satisfactory results were not obtained inasmuch as the liquids available and suitable for the purpose will, when exposed to air in a highly heated state, decompose or react chemically and form a solution having a harmful and corrosive effect on the materials of the system. Such troubles will not be likely to occur in a closed system and the use of high boiling point liquids is therefore more practicable.

For the successful functioning of a closed system there arise certain problems which are not present in an open system. In the first place, the parts of the radiator, which are usually made of very thin metal for maximum heat transfer, and the assembly as a whole must be made stronger and more rugged to withstand the high internal pressure. Then too, since the system is to be operated the full capacity, provision must be made to take care of volumetric variations of the coolant upon temperature changes. To meet these conditions it is here proposed to provide in a closed system an improved radiator of sturdy and economical construction which involves, among other things, a receptacle for the temporary storage of excess coolant to be subsequently returned to the system, and automatically operated means controlling flow to and from the tank as needed to maintain constant the volume of liquid in the circuit. By the construction afforded, loss of overflow liquid and the need for frequent replenishment and also exposure of highly heated coolant to the air are practically eliminated.

For a better understanding of the nature of the present invention reference may be had to the accompanying drawings, wherein Figure 1 is an elevation of an engine and a radiator associated therewith to illustrate the circuit here involved.

Figure 2 is a front elevation, partly in section, showing on a larger scale the radiator structure illustrated in Figure 1.

Figure 3 is a fragmentary elevation, partly in section, looking in the direction of the arrows on line 3—3 of Figure 2.

Figure 4 is a detailed sectional view taken on line 4—4 of Figure 2.

Figure 5 is a front elevation with parts in section illustrating a modified radiator construction.

Figure 6 is a side elevation looking in the direction of the arrows on line 6—6 of Figure 5.

Figure 7 is an enlarged fragmentary sectional view showing the parts in the upper left hand corner of the structure of Figure 5.

Figure 8 is a sectional view taken on line 8—8 of Figure 6.

Referring to the drawings, the engine shown in Figure 1 is of a type commonly installed in aircraft. The case or housing 1 for the crankshaft is shown above the cyinder block 2 and mounted on the top side of the crankcase is the cooling radiator having connections 3 and 4 with the cooling jacket of the cylinder block. An engine driven pump 5 is interposed in one of the connections for forcing the coolant through the circuit. A pressure gage 6 may be added if desired, for indicating internal pressures.

To lend a degree of inherent strength to the radiator structure the core or heat transfer unit is shown as consisting of a substantially circular assembly of tubes. For convenience of manufacture the core assembly 7 may take a polygonal shape, that shown in the drawings being of 12-sided configuration. The tubes are shown as having at opposite ends expanded hexagonal portions which fit or nest one against the other and are secured together by solder or other suitable joining material which also seals the spaces between the intermediate portions of the tubes. This in general is a common form of core assembly and it will be readily understood that the spaces between the tubes are for the flow of hot liquid and the hollow spaces within the tubes for the flow of air or other fluid which takes up the heat from the liquid.

Surrounding the assembly is a circular member of substantially channel shape in cross section which provides an annular space within the channel and between the base thereof and the exterior of the core assembly. This annular member is shown in the drawings as consisting of a circular band 8 having its ends overlapped and secured together by means of rivets 9 and solder, or by other suitable means, together with a pair of rings 10—10 of substantially S-shape in section with the inturned legs of the two S-shaped rings secured along opposite edges of the band 8 as by means of rivets 11. The other leg of each ring 10 is corrugated or provided with undulations which fit or nest against the enlarged ends of the peripheral tubes in the core asembly. The reverse bends in the intermediate portion of the ring impart thereto a certain amount of resiliency which is intended to relieve the structure from the imposition of severe strains.

Extending across the space within the channel and in annular spaced relation are a pair of baffle plates or partitions 12 which divide the space into headers on opposite sides of the core for the inflow and outflow of cooling liquid. These division plates 12 are shown in the drawings at the top and bottom of the assembly and for convenience are of substantially U-shape with the base of the U engaging an adjacent flat side of the core and the legs secured to the annular band 8. The uppermost division plate is preferably provided with an opening in its base to permit communication between the core assembly 7 and the filler neck 13 secured at the top of the band 8 and closed by the cap 14. The tube 15 leading from the filler neck is intended for connection with a pressure gage. Along the opposite sides of the band there are secured the elbow fittings 16 for attachment with the connections 3 and 4 leading to and from the engine jacket for communicating therewith the radiator inlet and outlet headers.

Secured on the underside of the structure in any suitable fashion is a box-like member or pan 17 which cooperates with the adjacent portion of the band to provide an expansion tank or receptacle for excess liquid in the system. In the opposite side walls of the tank and leading from the upper portion thereof are a pair of vent tubes 18 which extend upwardly and around the assembly where they are open to atmosphere at the top. The use of two vent tubes insures the venting of the overflow tank regardless of any reasonable tilting of the assembly in use, and also minimizes the possibility of loss of liquid from the system. Mounted on the side wall of the tank is shown a fitting 19 having a lateral bore 20 therein connected by the upwardly extending pipe 21 to the filler neck 13. Within the bore 20 is threaded a tubular sleeve or cage 22 providing a seat and a guide for the check valve 23 held on its seat by an expansion spring 24 which abuts an adjustable stop 25 threaded in the interior of the cage, whereby the tension of the spring may be varied. A closure cap 26 is threaded on the exterior of the sleeve to conceal the adjustable stop. Beyond the valve seat the cage 22 is provided with a number of lateral ports 27 leading into an annular chamber 28 in the fitting from which extends a lateral bore 29 registering with an opening in the wall of the tank 17 for the flow into the tank of any liquid which overflows from the system through the pipe 21 and past the valve 23. A second passageway 30 in the fitting 19 is connected by a pipe 31 to the adjacent header and contains a seat for a check valve 32 which is normally held on its seat by the expansion spring 33 secured in the bore 30 by the plug 34. Mounted in the wall of the tank 17 in alinement with the passageway 30 is an elbow or downwardly curved pipe 35 opening at the bottom of the tank. The operation of these parts will be referred to later.

The overflow tank 17 is shown resting upon a cushioning pad 36 of felt, rubber or the like, within a depression in the upper face of the mounting plate 37 and the assembly is held down by means of a pair of U-shaped wires 38 engaging with the rings 10 and held by suitable nuts to the mounting plate. The mounting plate in turn is provided with attachment lugs 39 by which it may be secured to the crankcase of the engine or other support.

In use the cap or closure member 14 at the filler neck is first removed to permit pouring in liquid or cooling media to completely fill the system after which the cap is replaced. The system is now completely filled with liquid and sealed against the entrance of air. Upon operation of the engine the liquid, upon absorbing heat, will expand, thereby creating an internal pressure in the system. As before pointed out, the internal pressure is beneficial in improving the absorption and dissipation of heat. Since, however, the pressure, if allowed to build up, would rupture the parts, means have been provided, as above described, to relieve the pressure after it passes a predetermined value and receive the liquid in excess of the capacity of the system. In other words, expansion of the liquid beyond a certain point is taken care of by permitting the excess to flow into the expansion tank 17 as soon as the pressure builds up sufficiently to overcome the tension of the spring 24 behind the check valve 23. The overflow will take place automatically and whenever the liquid expands beyond the safe carrying capacity of the system. This action may be governed by regulation of the adjustable plug 25 to vary the spring force. In order that this liquid will not be completely discharged from the system, and in order too that the full capacity may be automatically maintained at all times, there has been provided the return line controlled by the check valve 32. This check valve is opened against the tension of its spring 33 whenever the pressure within the system drops incident to a contraction of the liquid volume upon cooling and the liquid within the tank 17 will be sucked back past the check valve 32 and into the system.

In the modified form of the invention shown in Figures 5 to 8 the core 40 is similar to that heretofore described except that its exterior shape is of rectangular contour. Surrounding the top and two sides of the core assembly is a U-shaped band 41 having in its side portions an outward depression which imparts to the side strap a channel shape in cross section to afford inlet and outlet headers for the flow of liquid across the tubes. At their lower ends the side straps are secured to a downwardly open box-like member 42 which extends across the bottom of the assembly and receives telescopically an upwardly open box-like member or pan 43 to provide an overflow tank. This upwardly open member 43 is preferably provided with downwardly inclined walls which afford in the lowermost portion a depression or sump into which extends the down turned end of the pipe 44 which leads to a fitting 45 secured to the exterior of the tank. The fitting 45 is provided with a bore 46 in which is located an expansion spring 47 seated at one end against a plug 48 and at its opposite end against a check valve 49 to normally maintain the valve in closed position. Behind the valve the bore 46 communicates through the passageway 50 with an adjacent header and in advance of the valve is connected with the aforesaid pipe 44 and also an upwardly extending pipe 51 leading to the fitting 52, forming a part of the filler neck 53 mounted on the cross portion of the U-shaped strap 41. Within the fitting 52 is located a spring pressed check valve 54 which controls communication between the pipe 51 and the interior of the filler neck. Closing the filler neck is the cap 55 and leading from the interior of the filler neck is a pipe 56' for connection with a pressure gage, not shown. Also mounted in the fitting 45 extending through the wall of the expansion tank is one end of an upwardly extending vent pipe 56 which communicates through a passageway in the fitting with a lateral tube 57 projecting within the tank and terminating in an upwardly extending bent portion in the top central part of the tank. The expansion tank is thus vented to atmosphere and the location of the end of the pipe 57 will accommodate any reasonable tilting of the parts and still afford the vent.

The operation is similar to that heretofore referred to. Upon expansion of the liquid the internal pressure beyond the predetermined amount will open the check valve 54 and allow the excess liquid to flow through the pipe 51 to the passageway in the fitting 45 and then out the pipe 44. On the other hand, any depression in the system will overcome the tension of the spring 47 and open the check valve 49 to allow the coolant to be sucked back through the pipe 44 into the passageway of the fitting and past the check valve through the passageway and into the intake header.

We claim:

1. In combination a circulatory system for heat conducting media, which is closed to atmosphere and includes a heat generating unit and a heat dissipating unit, means open to atmosphere and independent of said system to temporarily receive for subsequent return such media in excess of system capacity resulting from volumetric variations with temperature changes, and valve means controlling communication between the system and said first mentioned means automatically operated through pressure differences between the system and said first mentioned means.

2. In a circulatory system for heat conducting media, which is closed to atmosphere and includes a heat generating unit and a heat dissipating unit, means to temporarily receive for subsequent return such media in excess of system capacity resulting from volumetric variations with temperature changes, a pressure operated valve controlling flow from the system to said means and a second pressure operated valve controlling return flow from said means to the system.

3. In combination with a circulatory cooling system for engines or the like and which is closed to atmosphere and operated at full capacity, an expansion tank to receive and temporarily store cooling liquid in excess of system capacity, means automatically operated by a pressure rise in the system incident to temperature increase to flow excess liquid to the tank and other means operated automatically by a pressure drop in the system incident to temperature decrease to permit return of such liquid to the system and thereby maintain the liquid volume in the system substantially constant.

4. In combination with a circulatory cooling system for engines or the like and which is closed to atmosphere and operated at full capacity, a tank to temporarily store excess liquid as it expands beyond the capacity of the system, connections between the tank and system, a valve in one of said connections automatically operated by pressure in the system to pass excess liquid to the tank and a valve in another of the connections automatically operated by suction in the system to return such liquid from the tank as needed to maintain the liquid volume of the system substantially constant.

5. In combination with a circulatory liquid cooling system for engines or the like and which is closed to atmosphere and operated at full capacity, a tank open to atmosphere for the temporary storage of such liquid as expands beyond the capacity of the system, and a pair of spring loaded valves between the tank and system, acting against pressures inside and outside the system respectively to control flow to and from the tank and maintain the volume of liquid in the system substantially constant at all times.

6. Radiator structure including a substantially circular assembly of tubes, each having at opposite ends enlarged polygon portions which fit corresponding portions of adjacent tubes and hold intermediate portions thereof in spaced relation, an annular band encircling said assembly and having a channel shape in transverse section, with outturned end flanges that are corrugated to fit the surfaces of the polygonal ends of the peripheral tubes of the assembly, each side wall of the channel having a reverse bend therein to impart resiliency thereto, and a pair of partition elements in annular spaced relation extending across the space within the channel between the tubular assembly and the band to divide such space into inlet and outlet headers for the spaces between the tubes.

7. Radiator structure including a substantially circular assembly of tubes, each having at opposite ends enlarged polygon portions which fit corresponding portions of adjacent tubes and hold intermediate portions thereof in spaced relation, an annular band encircling said assembly and having a channel shape in transverse section, with outturned end flanges that are corrugated to fit the surfaces of the polygonal ends of the peripheral tubes of the assembly, and a pair of partition elements in annular spaced relation extending across the space within the channel between the tubular assembly and the band to divide such space into inlet and outlet headers for the spaces between the tubes.

8. Radiator structure including a substantially circular assembly of tubes, each having intermediate its ends a reduced portion to provide spaces therebetween, an annular band of substantially channel shape in cross section encircling said assembly and having flexible side walls, and means to divide the space within the channel into inlet and outlet headers for the spaces between the tubes, an overflow tank secured to the exterior of the band, and means communicating said tank with one of the headers.

9. Radiator structure including a substantially circular assembly of heat radiating elements which presents a corrugated peripheral surface, an annular band encircling said assembly and having a channel shape in cross section with lateral end flanges that are corrugated to mate with the corrugated peripheral surface of said assembly and means to divide the space within the channel to provide inlet and outlet headers for the heat radiating elements.

10. Radiator structure including a heat radiating core, a strap positioned about the core and provided with portions of channel shape in cross section to afford inlet and outlet headers for the core, an expansion tank carried by the strap for the temporary storage of excess coolant to be later returned, and pressure controlled valve means to automatically communicate the core and tank under predetermined conditions.

11. The structure of claim 10 wherein the bottom wall of the tank converges downwardly and an outlet is positioned in the lowermost portion thereof.

12. Radiator structure including a heat radiating core, a U-shaped strap extending across the top and down the sides of the core and having its side portions of channel shape to provide inlet and outlet headers for the core, a downwardly open box-like member secured by the lower ends of the strap across the bottom of the core, an upwardly open box-like member telescopically received within and cooperating with the first mentioned member to afford an overflow tank, and means automatically controlling communication between the core and tank.

13. Radiator structure including a heat transfer unit, a band of substantially channel shape in cross section encircling said unit and having side walls of substantially S-shape in section to impart resiliency thereto, and means to divide the space within the channel into inlet and outlet headers for the heat transfer unit.

JAMES A. WHITE.
HAROLD CAMINEZ.